United States Patent [19]
Kleinpeter

[11] 3,979,579
[45] Sept. 7, 1976

[54] AIRCRAFT ENGINE FATIGUE CYCLE RECORDER

[75] Inventor: Joseph Kleinpeter, Center Moriches, N.Y.

[73] Assignee: Lawrence Peska Associates, Inc., N.Y.; a part interest

[22] Filed: May 19, 1975

[21] Appl. No.: 579,037

[52] U.S. Cl.............................. 235/150.2; 73/116; 235/92 MT; 235/150.22; 244/194
[51] Int. Cl.² .......................................... G06G 7/78
[58] Field of Search....... 235/150.2, 150.22, 150.23, 235/92 MT, 92 TC; 73/510, 178 T, 116, 67.3, 117.4; 244/42 B, 77 M, 77 R; 340/27 R; 60/223

[56] References Cited
UNITED STATES PATENTS

| | | | |
|---|---|---|---|
| 3,238,768 | 3/1966 | Richardson | 235/150.2 |
| 3,512,128 | 5/1970 | Maki | 340/27 |
| 3,593,012 | 7/1971 | Lang | 235/150.2 |
| 3,678,256 | 7/1972 | Harenberg, Jr. | 235/150.2 |
| 3,686,484 | 8/1972 | Clemochowski | 73/116 |
| 3,758,756 | 9/1973 | Johns | 235/92 MT |

*Primary Examiner*—Malcolm A. Morrison
*Assistant Examiner*—Errol A. Krass
*Attorney, Agent, or Firm*—Jack D. Slobod

[57] ABSTRACT

In an aircraft, a system for recording aircraft fatigue cycles senses engine starting, engine shutdown, landing gear status, engine reversal and throttle setting and derives therefrom unit and fractional cycles. The system includes a first memory responsive to the aforementioned sensors for producing an indication of when the aircraft is in flight and a second memory for producing an indication of when the landing gear are dropped in flight. These memory indications are fed to gates which index the units counter when a takeoff, landing and engine shutdown cycle is completed and which index the fractions counter when a retakeoff without engine shutdown is accomplished. Other gates cause the units counter to be indexed when the engine is restarted in flight. In a multi-engine aircraft, sensors and counters are provided individually for each engine.

3 Claims, 2 Drawing Figures

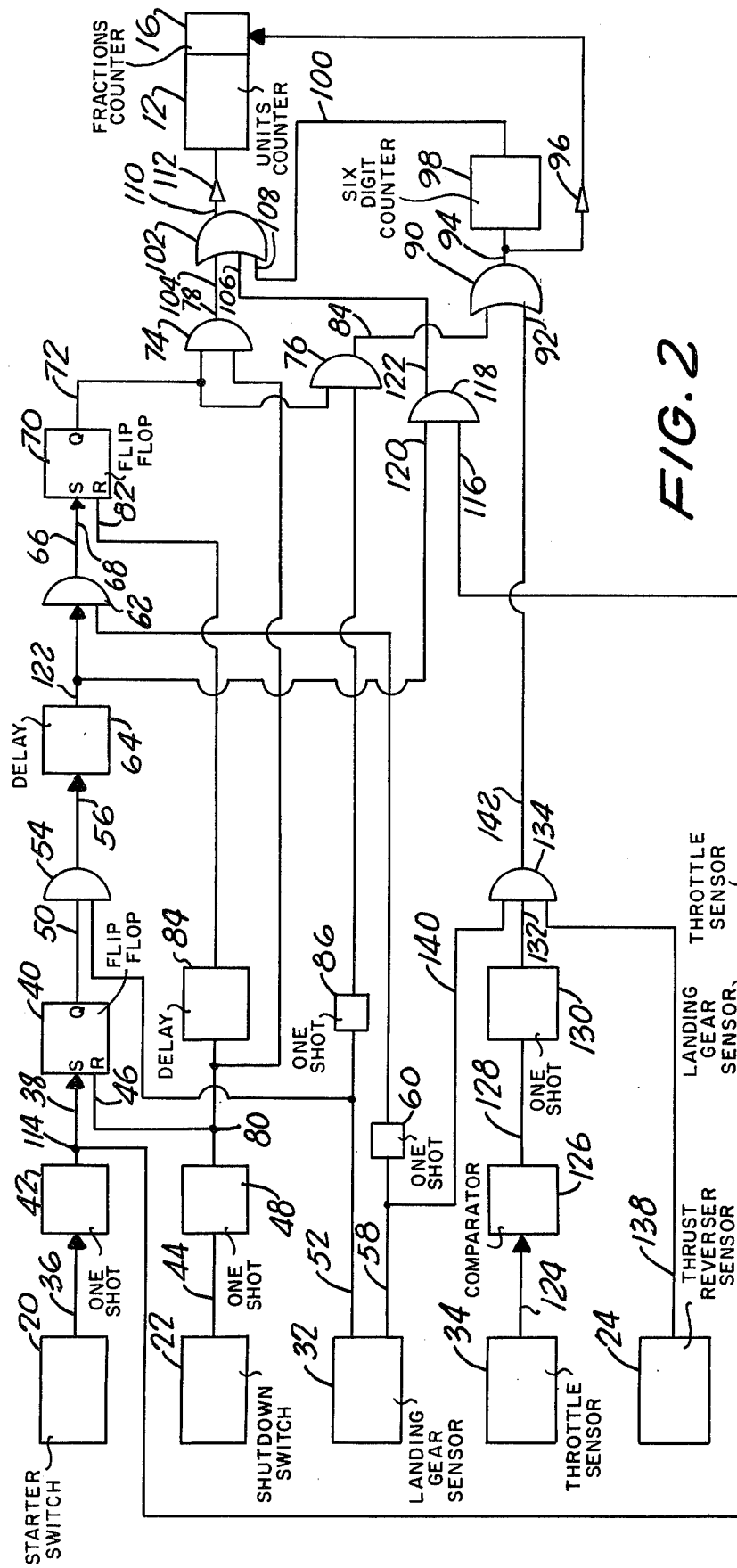
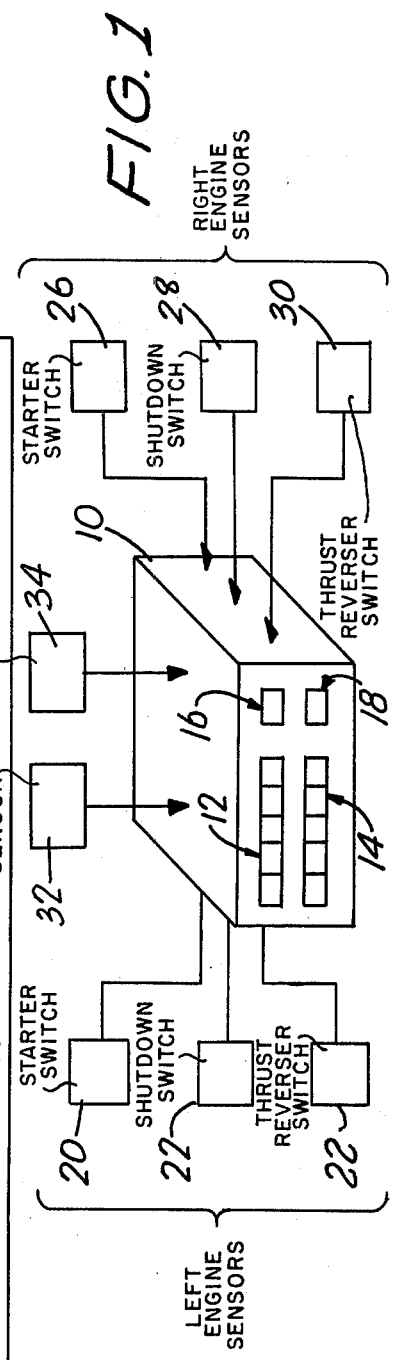
FIG. 2
FIG. 1

3,979,579

AIRCRAFT ENGINE FATIGUE CYCLE RECORDER

FIELD OF THE INVENTION

The present invention relates generally to flight recording systems for aircraft and relates more specifically to a system for automatically recording engine fatigue cycles.

BACKGROUND OF THE PRESENT INVENTION

Aircraft turbine engine manufacturers have established various service life limits for the rotating parts of an engine based primarily on the number of repeated and/or alternating fatigue causing stress cycles undergone by the rotating parts. These fatigue or stress cycles result from transients of engine speed and temperature occurring during normal engine operation.

The manufacturers have defined a cycle as a flight consisting of the usual start, takeoff, landing and shutdown. Various less usual events have been given a weight as a full cycle or a fraction of a cycle. Thus, an air start is considered to be one cycle, while a landing without engine shutdown, followed by another flight, a touch and go landing or go around, or an advancement of throttle beyond 65%, when thrust reversing is used, each are counted as 1/6 cycle.

Presently, these stress cycles are kept track of by log entries by the pilot or copilot. Generally, also the records are not kept separately for each engine in a multi-engine aircraft resulting in unnecessary overhauls.

If a system could be found which would automatically keep track of stress cycles, a great deal of accuracy would result. Furthermore, if the stress cycles undergone by each engine of a multi-engine aircraft were monitored separately, unnecessary overhauls would be eliminated.

OBJECTS OF THE INVENTION

It is a primary object of the present invention to provide an accurate and automatic system for monitoring and recording engine stress cycles.

It is a further object of the present invention to provide a system for individually monitoring and recording the stress cycles undergone by each engine of a multi-engine aircraft.

SUMMARY OF THE PRESENT INVENTION

Briefly, the aforementioned objects are achieved by providing sensors in the aircraft for sensing engine starting, engine shutdown, landing gear status, engine reversal and throttle setting. From the outputs of these sensors there are derived signal indications of when the aircraft is in flight and when the landing gear drop in flight. The occurrence of a full or fractional cycle is derived from these signal indications and from the sensor outputs. Counters for each engine are automatically incremented at the completion of a stress cycle.

Other objects, features and advantages of the present invention will become apparent upon a perusal of the following detailed description of one embodiment of the present invention when taken in conjunction with the appended drawing wherein:

FIG. 1 is a block diagram illustrating a display box and various sensors for the left and right engines of a two engine aircraft.

FIG. 2 is a block diagram illustrating the logic circuitry within the display box in combination with the sensors for the left engine. The circuitry for the right engine is identical.

DETAILED DESCRIPTION

FIG. 1 depicts a display and logic box 10 responsive to various sensors for automatically counting and displaying engine stress cycles for the left and right engines of an illustrative two engine jet aircraft. There are respectively five digit decimal cycle unit displays 12 and 14 and one digit fractional displays 16 and 18 in sixths of a cycle, for the left and right engine.

In order to individually keep track of the stress cycles for each engine, there are a set of sensors for each. For the left engine there are fed to box 10 contacts from the starter or ignition switch 20 and the shutdown switch 22. Also a thrust reverser sensor 24 is provided to sense when the left engine is reversed. The right engine similarly has contacts from starter switch 26 and shutdown switch 28 fed to box 10 as well as the output from thrust reverser sensor 30.

Also a landing gear sensor 32 has its output, indicative of whether the landing gear are up or down, fed to box 10. Lastly, a throttle sensor 34, which may be a potentiometer with a variable resistance indicative of the throttle setting, has its output fed to box 10.

Now reference is made to FIG. 2, which shows a block diagram of the contents of box 10 in combination with the various sensors, will be referred to in order to explain how the sensor outputs are utilized to automatically count and display stress cycles for each engine. The circuitry for the left engine is illustrated in FIG. 2 with the understanding that the circuitry for the right engine is identical and would therefore involve much repetition of description.

As previously explained, starting, takeoff, landing and shutdown count as one cycle while starting, takeoff, landing and retakeoff without engine shutdown count only as 1/6 cycle. In the logic circuitry the occurrence of various events are stored and the occurrence of a cycle is derived from the stored signal indications.

Thus the output 36 of starter switch 20 is fed to the set input 38 of a flip-flop memory 40 via one shot 42 while the output 44 of shutdown switch 22 is fed to the reset input 46 of flip flop 40 via one shot 48. As a result the Q output 50 of flip-flop 40 provides an indication of when the engine is running, i.e., Q output 50 is digital one only when the engine has been started and hasn't subsequently been shut down.

For providing a indication of when the aircraft is in flight, the output 52 of landing gear sensor 32 which is digital one when the landing gear are up is used in connection with Q output 50. Outputs 50 and 52 are fed to AND gate 54, whose output 56 is digital one when both the engine is running and the gear are up.

For providing a digital indication of when a start, takeoff and landing have sequentially occurred, another output 58 of landing gear sensor 32 is utilized in combination with output 56. Output 58 is applied via one shot 60 to one input of AND gate 62. The other input of AND gate 62 is fed by output 56 via a delay 64. It should be understood that the pulse width outputs of each of the one shots employed are preferably of the same lengths and that the delays of elements 64 and 84 are longer than the one shot pulse widths. Thus upon falling of the landing gear with the plane in flight a digital one pulse will appear at the output 66 of AND gate 62. While the output 56 of AND gate 54 will change state simultaneously with the leading edge of the aforementioned digital one pulse, this change of state is sufficiently delayed by delay 64 so as not to inhibit the appearance of the pulse at AND gate output 66.

Output 66 is fed to the set input 68 of flip-flop 70. Thus upon the dropping of the landing gear in flight, flip-flop 70 will be set and its Q output 72 will be digital one. Thus, flip-flop 70 constitutes a memory element whose output 72 is digital one when there has been an engine start, a takeoff and then a landing.

Output 72 is applied in parallel to a pair of AND gates 74 and 76 which respectively direct the digital one indication of, output 72 to either increment units counter 12 or fractions counter 16 depending upon whether the landing is followed by a shutdown or by a re-takeoff without intermediate shutdown.

In the event of engine shutdown, the other input of AND gate 74 is fed from shutdown switch output 44 via one shot 48 to gate a digital one pulse through to the output 78 of AND gate 74. For resetting flip-flop 70 subsequent to the pulse, the output 80 of one shot 48 is fed to the reset input 82 of flip-flop 70 via delay 84.

In the event of retakeoff without intermediate engine shutdown, a digital one pulse appears not at the output of AND gate 74 but at the output 84 of AND gate 76. This is accomplished by feeding the landing gear sensor up - indicating output 52 to the other input of AND gate 76 via one shot 86.

AND gate 76 output 84 is applied to one input 88 of two input OR gate 90. The other input 92 of OR gate 90 is fed from circuitry yet to be described which derives a digital one pulse if the throttle exceeds 65% during thrust resensor operation. The output 94 of OR gate 90 drives a buffer amplifier 96 which in turn drives the electromechanical fractions counter 16. To mechanize a carry pulse to electromechanical units counter 12 when the fractions counter 16 goes from 5/6 to 0/6, output 94 also feeds a six digit electronic counter 98 whose overflow output 100 feeds electromechanical units counter 12 via OR gate 102.

For incrementing units counter 12 in the event of a start, takeoff, landing and shutdown, AND gate 74 output 78 is fed to input 104 of three input OR gate 102. The other inputs 106 and 108 to OR gate 102 are respectively fed from circuitry yet to be described which generates a digital one pulse in the event of an air start and from the overflow output 100 of counter 98. The output 110 of OR gate 102 drives electromechanical units counter 12 via buffer amplifier 112.

In order to increment units counter 12 when there is an air start, the output 114 of one shot 42, which is fed by starter switch 20, is applied to one input 116 of AND gate 118. The other input 120 of AND gate 118 is fed by the output 122 of delay 64 which provides an indication of when the aircraft is in flight. As a result, the output 122 of AND gate 118 provides a digital one pulse when an air start is attempted. Output 122 feeds input 106 of OR gate 102 for suitably incrementing counter 12.

For incrementing fractions counter 16 in the event of greater than 65% throttle being used during thrust reversal, the output 124 of throttle sensor 34 is applied to an electronic comparator or limit switch 126 which provides at its output 128 a digital one indication of when 65% throttle is exceeded. Output 128 is applied via one shot 130 to one input 132 of three input AND gate 134. Input 136 of AND gate 134 is fed from thrust reverser sensor 24 output 138 which provides a digital one indication when the engine is reversed. As an optional feature, input 140 of AND gate 134 may be fed from landing gear down-indicating output 58. Thus, AND gate 134 output 142 provides a digital one pulse when the thrust reverser is used, 65% throttle is exceeded and the landing gear are down. For incrementing the fractions counter in such event, output 142 is applied to OR gate 90 input 92.

It should now be appreciated what has been described is a completely automatic system for incrementing units counter 12 in the event of either a start, takeoff and landing cycle or an air start and for incrementing fractions counter 16 in the event of either a retakeoff without engine shutdown, or when the throttle exceeds a predetermined setting when the thrust reverses are used during landing. It should furthermore be appreciated to those skilled in the art that since the deployment of the landing gear are considered indicative of a landing, a touch and go landing or turn around will be treated by the circuitry as a retakeoff without shutdown and will consequently register the proper 1/6 cycle increment.

Having described one embodiment of the present invention it should be appreciated that numerous other embodiments are possible within the spirit and scope of the invention.

Accordingly, what I claim is:

1. In a jet aircraft, a system for sensing and recording engine fatigue cycles comprising: a units counter and a fractions counter for counting the number of engine fatigue cycles, means for sensing the starting of an aircraft engine, means for sensing the shutdown of said aircraft engine, means for sensing the status of the aircraft landing gear, first memory means responsive to said starting sensing means, said shutdown sensing means and said landing gear status sensing means for producing an indication of when said aircraft is in flight, second memory means responsive to said first memory means and said landing gear status sensing means for producing an indication of when the landing gear have fallen in flight, means responsive to said second memory means, said landing gear sensing means and said shutdown sensing means for indexing said fractions counter if the landing gear are raised prior to engine shutdown and for indexing said units counter when said engine is shutdown and means responsive to said first memory means and said starting sensing means for indexing said units counter if said engine is started in flight, and means for indexing said units counter when said fractions counter has counted a whole unit.

2. The system of claim 1 further comprising: comparator means for sensing whether the throttle for said engine is set above some predetermined setting, means for sensing when the aircraft engine is reversed and means responsive to said comparator means and said reversal sensing means for indexing said units counter when said engine is reversed and said predetermined setting is exceeded.

3. In a multi-engine aircraft, counter means for individually displaying stress cycles undergone by each engine, means for individually sensing the starting, shutdown, and thrust reversal of each engine, means for sensing the status of the aircraft landing gear, means for sensing the throttle setting for the engines and logic means responsive to said various sensing means for deriving a count of stress cycles individually for each engine and means responsive to said deriving means for individually indexing said counter means.

* * * * *